United States Patent [19]

Thomas et al.

[11] Patent Number: 5,798,828
[45] Date of Patent: Aug. 25, 1998

[54] LASER ALIGNED FIVE-AXIS POSITION MEASUREMENT DEVICE

[75] Inventors: Bruce L. Thomas; Henry M. Bass; Lloyd K. Loftus; Russell J. Churchill, all of Radford, Va.

[73] Assignee: American Research Corporation of Virginbia, Radford, Va.

[21] Appl. No.: 614,888

[22] Filed: Mar. 13, 1996

[51] Int. Cl.$^6$ .............................. H04B 10/00; B23B 39/08
[52] U.S. Cl. .................... 356/141.3; 356/139.03; 33/286; 408/13
[58] Field of Search .............. 356/141.3, 139.03; 33/286; 408/13; 359/139.05, 139.06

[56] References Cited

U.S. PATENT DOCUMENTS

| | | |
|---|---|---|
| 4,712,953 | 12/1987 | Witzel et al. . |
| 4,808,064 | 2/1989 | Bartholet .................. 356/152 |
| 4,966,460 | 10/1990 | Kahley . |
| 5,044,844 | 9/1991 | Backhouse . |
| 5,148,232 | 9/1992 | Duey et al. . |
| 5,240,359 | 8/1993 | Backhouse . |
| 5,367,373 | 11/1994 | Busch-Vishniac et al. ....... 356/139.03 |
| 5,596,403 | 1/1997 | Schiff et al. ............... 356/139.03 |

OTHER PUBLICATIONS

The Association for Manufacturing Technology, "The Economic Handbook of the Machine Tool Industry", p. C–19 (U.S.A. 1993–1994).
Advertisement for *Models CPM820, CPM848 & CPM 878*, Climax Portable Machine Tools, Inc., one page advertisement, Jan. 1994.

Bursanescu et al., "Laser System for High Accuracy . . . ", Rev. Sci. Intrum. pp. 1686–1690 (May 1994).
Earl Cox, "Adaptive Fuzzy Systems", IEEE Spectrum, pp. 27–31, Feb. 1993.
Farhad Daghigian, "Optical Position Sensing . . . ", Sensors, pp. 31–32, 34, 37–39 (Nov. 1994).
Dorsey, "Vibration Characteristics . . . ", NASA Technical Paper 2160, pp. 1–26 (Jun. 1983).

(List continued on next page.)

*Primary Examiner*—Mark Hellner
*Attorney, Agent, or Firm*—James Creighton Wray; Meera P. Narasimhan

[57] ABSTRACT

A laser-based multi-axis position measurement unit measures position deviations in 5 axes while traversing a 6th linear axis. The apparatus includes three components: 1) a laser-beam unit which emits two parallel laser beams; 2) a sensor unit including at least three laser-position sensors, one of them being transparent; and 3) a microprocessor or computer unit which converts X,Y laser position data from the three sensors to displacements in 5 axes: X (horizontal), Y (vertical), Pitch (angular motion about the X axis), Yaw (angular motion about the Y axis), and Roll (angular motion about the line of travel). Readout of the 6th axis, the line of travel, is provided by means of a separate linear transducer or laser-based ranging system. The device includes an arrangement of three digital sensors on two parallel laser beams to deduce position in 5 axes. Applications for the measurement unit exist in machine tool measurement and calibration, robotics, coordinate measurement machines, optical alignment and other areas where position in multiple axes must be determined. The position information may be directly displayed or used as input for a closed-loop positioning system.

45 Claims, 2 Drawing Sheets

OTHER PUBLICATIONS

Fichter, "A Stewart Platform–Based Manipulator . . . ", The International Journal Of Robotics Research, pp. 157–182 (Summer 1985).

Luxon et al., "Industrial Lasers . . . ", 2nd. Ed., Prentice–Hall, Inc., pp. 80–83, 161–203 (U.S.A. 1992).

"Building a Case for Rebuilding", Manufacturing Engineering, pp. 62–64 (May 1991).

McCulloch et al., "A Logical Calculus of the Ideas . . . ", Bulletin Of Mathematical Biophysics, pp. 115–133 (1943).

Rhodes et al., "Deployable Controllable Geometry Truss Beam", NASA Technical Memorandum 86366, p. 1015 (Jun. 1985).

Sprow "The Mechanics of Manufacture", Manufacturing Engineering, pp. 38–45 (Mar. 1992).

Stauffer, "Making the Right Moves in Machine Make–Over", Manufacturing Engineering, pp. 49–53 (Mar. 1990).

Tidwell et al., "Kinematic Analysis . . . ", presented at First Joint US/Japan Conf. on Adpative Structures, pp. 772–791 (U.S.A. Nov. 13–15, 1990).

U.S. Department of Commerce "U.S. Industrial Outlook", p. 16–2 (Jan. 1993).

Wu, "Development of New Techniques . . . ", USAF Wright Lab. Mfg. Tech. Directorate, Report No. WL–TR–92–8015 (Apr. 1992).

"Alignment at Laser Speed", Hamar Laser Instruments, Inc. Advertisement, Copyright 1990.

"Machine Tool Alignment Packages . . . ", Hamar Laser Instruments, Inc. brochure, Copyright 1994.

"Coupling II—The Complete Coupling alignment System", Hamar Laser Instruments, Inc. brochure, Copyright 1994.

"The Model L–723 Triple Scan Laser", Hamar Laser Instruments, Inc. brochures, Copyright 1992.

"Digital Position Sensing Detectors", EG&G Heimann Optoelectronics brochure and specifications, undated.

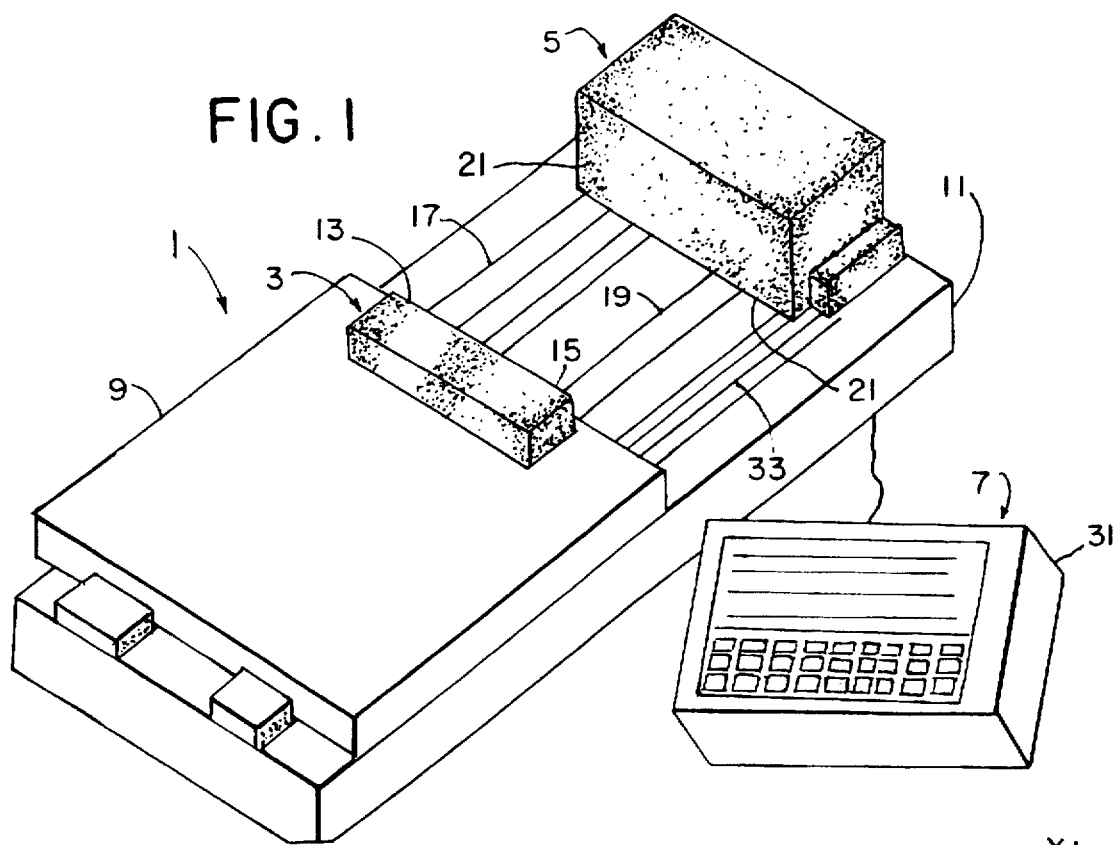
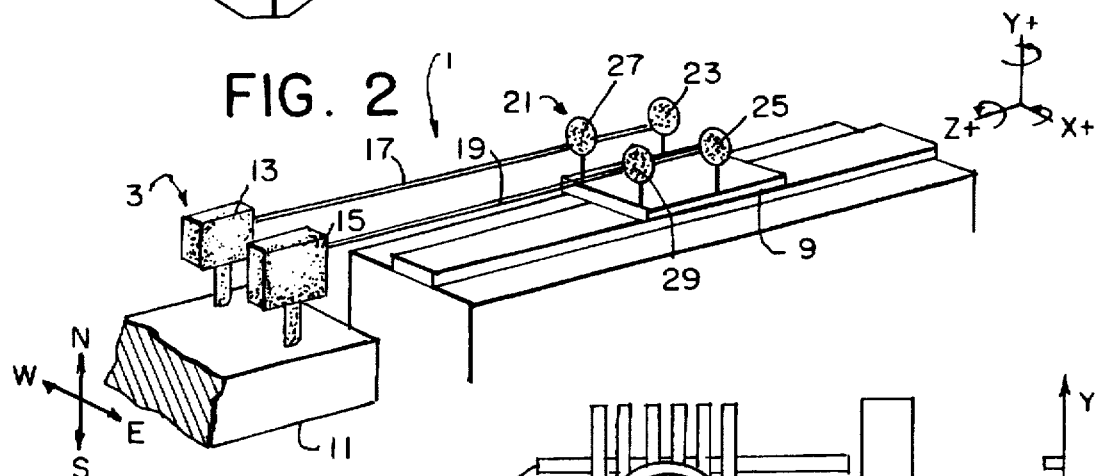
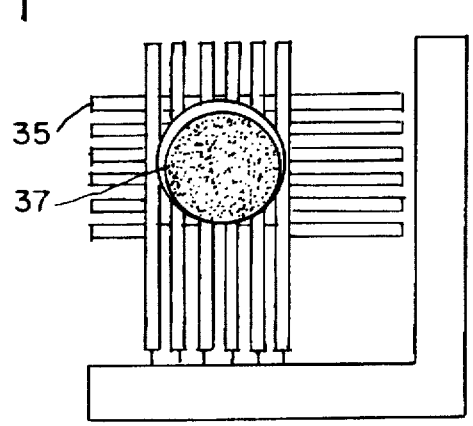
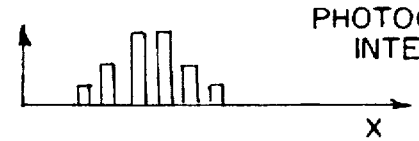

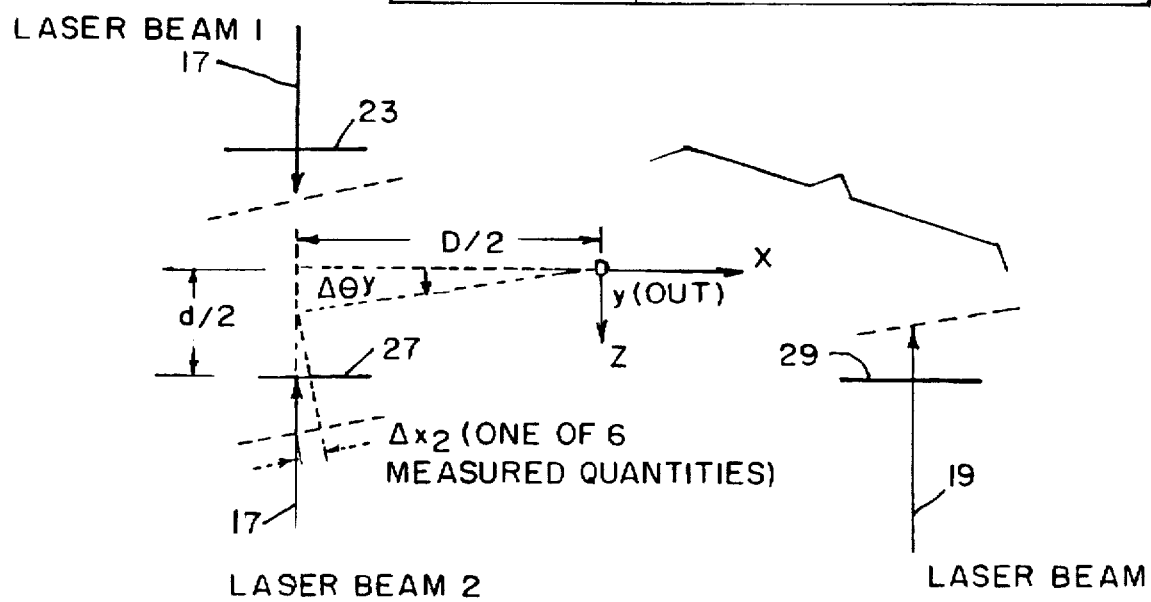

LASER ALIGNED FIVE-AXIS POSITION MEASUREMENT DEVICE

BACKGROUND OF THE INVENTION

This invention relates to precision positioning, laser alignment, robotics, and industrial metal-cutting machine tool metrology.

Needs exist for automated, transportable devices capable of providing a calibrated reference for the positioning errors of industrial machinery and other positioning devices. Currently, the market for machine metrology and calibration offers great potential. Machine tool positioning accuracy as well as the positioning accuracy of diverse industrial equipment has a direct impact on the quality of finished goods and the profitability of the manufacturer.

Existing metrology techniques offer less than five axes of measurement and are expensive. In the case of machine-tool rebuilding, the current techniques for measuring the out-of-tolerance conditions of rails and guideways on heavy machinery require first using a suspended wire with known sag and then employing micrometers for measuring surface-to-wire height and for correcting for wire sag. Alternatively, precision levels are used to align one track to the other. Laser measurement techniques currently in practice are significantly more costly, and offer at most four axes of position measurement. Needs exist for position measurement devices that operate faster, are more accurate, and are less skilled-labor intensive than existing techniques.

The need for multi-axis position feedback is well established. While numerous sensing techniques have been developed for the purpose of position feedback, those techniques have generally proven inadequate. Position sensing along a single axis is commonly implemented for machine tool position feedback in the form of linear and rotary encoding, linear potentiometers and linear velocity displacement transducers. In certain high-precision applications, laser interferometry techniques are used. Existing laser interferometry techniques have distinct disadvantages, including high costs, set-up times on the range of four hours per machine, and reduced effectiveness under loaded conditions due to inherent vibration and environmental sensitivities.

For multi-axis position feedback, accelerometers, smart tools with embedded sensors, laser aligned quadrant detectors and pixel array sensing techniques have been developed, as well as adaptations of interferometry which permit rotational axis sensing over a narrow range of motion. No techniques have evolved which cost-effectively provide for multi-axis position feedback in real time while machining operations are being conducted, either as a machine tool removes material or as a CMM executes rapid motion sequences. The lack of effective techniques is attributable to the harsh machining environment and the large relative motions common to computer numerically controlled (CNC) operations. Of the techniques currently available, adaptations of laser alignment are commonly made to permit use of the precise, axial nature of laser beams located remote from the sensing components, or, alternatively, the sensing components are positioned remote from machine-tool-mounted laser emitters.

Sensors that employ laser alignment techniques for deriving position deviations in multiple axes have been in existence for some time, but are only recently becoming competitive with other technologies. Those sensing technologies have generally proven inadequate in meeting the demands presented in most positioning applications, including machine tool multi-axis position feedback applications. One recently developed technique includes use of a laser system for high accuracy alignment and positioning that permits a long operating range of up to 50 m along a single laser path. The system is complex and includes a single quadrant detector with a four-axis beam delivery system which requires a moveable mirror, a rotating pentaprism and two moveable right angle prisms for four axis positioning within +/- 1 mm about the alignment axis. The measured position resolution using that technique is 1 μm and is limited by environmental parameters, such as vibrations and air currents. The low range and high sensitivity restraints of that technique prevent its use in dynamically loaded machine tool applications and CMM devices of moderate-to-large work volumes.

Another existing positioning technique offers a duolateral photoeffect diode with specialized data acquisition and signal processing. That technique employs amorphous silicon and photodiode junction arrays and delivers position coordinates of an impinging beam. Drawbacks encountered using that technique include large processing power requirements and delivery of only beam intensity profiles. A loss of signal integrity for large-scale displacements occurs due to the noise voltages and currents of amplifier circuits, resulting in reduced position accuracy for displacements beyond the order of millimeters. In addition, the analog-to-digital processing requirement of that technique is such that six wires are required to connect the sensor to the host controller.

Needs exist for precision measurement systems that are portable, easy to set-up, cost-effective and functionally indifferent to environmental conditions to allow for use during machine tool operations.

SUMMARY OF THE INVENTION

The present invention is a laser-based multi-axis position measurement apparatus. The device measures position deviations in 5 axes while traversing a 6th linear axis. The present invention includes three components: a laser-beam unit which emits two parallel laser beams, a sensor unit including three laser-position sensors, one of them being transparent, and a microprocessor or computer unit which converts X,Y laser sensor position data from the three sensors to displacements in 5 axes: X (horizontal), Y (vertical), Pitch (angular motion about the X axis), Yaw (angular motion about the Y axis), and Roll (angular motion about the line of travel). Readout of the sixth axis, the line of travel or Z axis, is provided by means of a separate linear transducer. The present invention includes a unique arrangement of three digital sensors on two parallel laser beams for deducing position in 5 axes.

Applications for this device exist in machine tool measurement and calibration, robotics, coordinate measurement machines, optical alignment and other applications where position in multiple axes is required.

Proper deployment of the present invention includes positioning the laser-beam unit on a moving portion of the object to be calibrated or measured. The laser unit is aligned and oriented in such a manner that the two parallel laser beams emitted by the laser unit are substantially parallel to the direction of travel of the moving part of the object. Alignment is facilitated by squaring two perpendicular edges of the laser unit against a surface of the object to be measured. Next, the sensor unit is positioned at one end of the stationary part of the object to be measured. The sensor unit is oriented such that the sensors are in the laser beam paths, with the laser beam impinging on the approximate centers of the sensors. A retractable cable extends between and is connected to the stationary sensor unit and the moving part of the object to be measured. The retractable cable is part of a position encoding sensor which provides a voltage signal to indicate approximate position in the Z axis, the direction of travel. Attachment of the cable is easily accomplished by means of a magnet or other acceptable mounting. The microprocessor unit is connected to the sensor unit for converting laser sensor position data from the sensors to displacements in five axes and for providing positional information along of the sixth axis.

Positioning error measurement begins when the movable part of the object to be measured is set into motion by the user. As the movable part traverses the stationary part of the object, the laser beams emitted from the laser unit impinge on the sensors, which in turn collect position data. The three sensors return three sets of position changes in the linear axes, x (horizontal) and y (vertical). The microprocessor unit converts the linear position data from the sensors to linear and angular position changes and continuously displays position errors in 5 axes along with the approximate position in the linear Z-axis. The position-error data received from the sensor unit is stored in the microprocessor's memory. That data may be transferred to a personal desktop computer for generating graphical representations of the data and for preparing summary reports.

Many critical positioning applications other than machining will also benefit from the present precision positioning apparatus, including operations related to rail transport, autonomous materials handling vehicles and robotic workstations. The present invention has potential uses as either open-loop or closed-loop feedback in assembly operations, docking maneuvers, micromachining, laser machining, material deposition, and inspection camera positioning.

Laser aligned 5-axis position measurement is efficient and precise. Operational characteristics include laser position measurements to 1 micron (40 millionths of an inch) for linear axes and 0.5 arc-second for angular resolution at a distance of 1 meter (39 inches), a 3 cm by 3 cm (1 inch by 1 inch) work envelope, and a working distance in the Z-axis from 30 cm to 20 meters (1 foot to 65 feet).

The laser alignment technique of the present invention is based on two parallel beams and four detectors. That alignment provides for position monitoring in five axes, including two translational axes, X and Y, and three rotational axes, pitch, roll and yaw. The laser alignment system need not be utilized strictly as a position readout device but rather can be implemented as closed-loop feedback to be added to existing machines as an improvement to positioning accuracy. Laser alignment of the present invention offers solid state, wear-free components, with potentially an order of magnitude resolution improvement over existing closed-loop feedback systems using linear velocity transducers, analog position sensitive detectors or servo positioning. Additionally, the problems associated with interferometry techniques are avoided, namely changes in the index of light refraction due to pressure, humidity and temperature.

The present invention includes transparent digital position sensitive detectors which provides for a unique arrangement of the sensors and delivers accuracy to 1 micron. Digital position sensitive detectors permit linear position measurement across the entire sensing field without the need for cosine error correction or calibration. The sensing area is approximately one inch by one inch square for each sensor. That area is easily made larger with larger sensors and no loss of accuracy.

Preferably a microcontroller, rather than a personal computer data acquisition system, is used for converting position data and displaying position errors. Numerous advantages are realized by using a microcontroller unit, including greatly increased cost savings, significant design simplification and size reduction of the overall system.

A position measurement apparatus for measuring position deviations in five axes when a moveable platform traverses a workpiece including an emitter unit mounted on the platform for generating source beams in directions generally parallel to a line of travel of the platform, a sensor unit positioned on the workpiece and aligned with the emitter unit for sensing the source beams and for providing position alignment data and a processing unit connected to the sensor unit for converting the position alignment data to displacements in five axes. The emitter unit includes a first emitter for emitting a first beam and a second emitter for emitting a second beam. The first emitter and the second emitter are adjustably mounted to the moveable platform. Preferably, the emitter unit is a laser beam emitter unit including a first laser beam source and a second laser beam source. The laser beam sources are selected from the group including a miniature laser and a laser diode. The laser beam sources are adjustably mounted to the moveable platform to allow rotation about a vertical yaw axis and a horizontal pitch axis.

The sensor unit includes multiple detectors. The detectors are preferably CCD arrays, photodetector arrays, quadrant sensing arrays, interferometry devices or digital position sensitive detection devices. Preferably, a first detector is positioned for receiving the first beam, a second detector is positioned for receiving the second beam and a third detector positioned between the first detector and the emitter beam unit. The third detector is a transparent detector that impinges a line of travel of the first beam and allows the first beam to continue to the first detector. A fourth detector may also be positioned between the second detector and the emitter beam unit, with the fourth detector being a transparent detector that impinges a line of travel of the second beam and allows the second beam to continue to the second detector.

The present invention further includes a linear measurement sensor for determining position in a translational direction. The linear measurement sensor is preferably a laser triangulation device, an interferometry device, an optical position encoder, a drive-axis servo-positioning encoder or a linear encoder. In one preferred embodiment, the linear measurement sensor is a position encoding sensor that includes a retractable cable and a variable resistor for converting position to voltage. The cable has a first end connected to the moveable platform and a second end connected to the resistor. A mounting, such as a magnet, connects the first end of the cable to the moveable platform.

The processing unit is preferably a microcontroller or a computer, such as a personal computer. The microcontroller preferably includes a display, a microprocessor and a keypad. The microprocessor is an eight bit microprocessor or a sixteen bit microprocessor, and the display is a liquid crystal display. A personal computer may be included with the microcontroller for receiving downloaded position data from the microcontroller and for constructing three-dimensional graphic representations of the downloaded position data.

In a preferred embodiment, the sensor unit includes multiple detectors, the emitter unit includes a pair of beam emitters for emitting first and second beams, and the detectors and the emitters are aligned such that beams emitted from the beam emitters and received by the detectors are substantially parallel or nearly parallel workpiece and off axis.

In another embodiment, the present invention is a position measurement apparatus for measuring position deviations in five axes that includes a moveable platform for traversing a workpiece, an emitter unit mounted on the workpiece for generating source beams in directions generally parallel to a line of travel of the platform, a sensor unit positioned on the moveable platform and aligned with the emitter unit for sensing the source beams and for providing position alignment data and a processing unit connected to the sensor unit for converting the position alignment data to displacements in five axes.

A method for measuring position deviations in five axes includes the steps of positioning an emitter unit having multiple beam emitters on a moveable platform, positioning a sensor unit having multiple detectors on a stationary workpiece, propagating at least two beams from the multiple beam emitters, orienting the emitters such that the at least two laser beams are generally parallel to each other and substantially parallel to a direction of travel of the moveable platform, aligning the multiple detectors such that one of the at least two laser beams impinges at least one detector, transversing the stationary workpiece with the moveable platform, continuously impinging the detectors with the at least two laser beams, generating position data from the at least two laser beams impinging on the detectors, and converting the position data to position-error data. The method may further include the steps of continuously displaying the position-error data, storing the position-error data, transferring the stored position-error data to a computer, generating graphical representations of the stored position-error data and generating a hard copy of the graphical representations.

The present method further includes the steps of providing a linear measurement unit and determining translational position in the direction of the moveable platform using the linear measurement unit. The providing a linear measurement unit step further includes providing a variable resistor and retractable cable having a first end and a second end, mounting the first end of the cable to the moveable platform, connecting the second end of the cable to the variable resistor and connecting the resistor to the sensor unit. The determining translational position step further includes converting position data from the cable to a voltage signal.

The alignment step of the present method preferably includes squaring perpendicular edges of the emitter unit against a surface of the workpiece and initializing to zero an angle of rotation about X, Y and Z axes relative to detector arrangement. The positioning a sensor unit step further includes providing a first detector in a path of the first beam, providing a second detector in a path of the second beam and providing a third, transparent detector in the path of the first beam between the first detector and the emitter unit. In another preferred embodiment, the positioning a sensor unit step further includes providing a fourth, transparent detector in the path of the second beam between the second detector and the emitter unit.

The generating and converting steps of the present method include interpolating positions of impinging beams on the detectors, resolving centroid positions of the beams, converting the beam centroid positions to hexadecimal coordinates and translating the hexadecimal coordinates to serial data.

These and other objects and features of the invention are apparent in the disclosure, which includes the above and ongoing written specification, with the claims and the drawings.

BRIEF DESCRIPTION OF THE DRAWINGS

FIG. 1 is an isometric view of the laser aligned five axis position measurement apparatus.

FIG. 2 schematically shows light source and detector placement for machine alignment.

FIG. 3 shows laser spot locations for motion in each axis.

FIG. 4 shows the digital position sensitive detector technique for laser alignment.

FIG. 5 shows the geometric relationships used to determine yaw, or rotational motion about the Y axis.

DETAILED DESCRIPTION OF THE PREFERRED EMBODIMENTS

Referring to the drawings, the present invention is a laser-aligned five-axis position measurement device 1. The device precisely measures position deviations in five axes. In a preferred embodiment, the device 1 is used for measuring the positioning accuracy of machinery.

The device 1, as shown in FIGS. 1 and 2, includes an emitter unit 3, a sensor unit 5 and a processing unit 7. As shown in FIG. 1, the emitter unit 3 is mounted on the moving part 9 of the machine, such as a movable platform, and the sensor unit 5 is mounted on a stationary part 11 of the machine. In an alternative embodiment, as shown in FIG. 2, the emitter unit 3 is mounted on the stationary part 11 and the sensor unit 5 is mounted on the moving part 9.

The emitter unit 3 includes multiple emitters 13, 15 for generating source beams 17, 19. The emitters 13, 15 or beam sources, are preferably adjustably mounted to allow rotation about a vertical yaw axis and a horizontal pitch axis and aligned such that the beams 17, 19 emitted from the emitters are substantially parallel to each other and to the workpiece. In a preferred embodiment, the emitter unit 3 includes a first emitter 13 for emitting a first beam 17 and a second emitter 15 for emitting a second beam 19. More emitters and laser beams may be included.

In preferred embodiments of the present invention, the emitter unit 3 is a laser beam emitter unit including first and second laser beam sources. The sources are preferably either miniature lasers or laser diodes.

As shown in FIGS. 1 and 2, the sensor unit 5 includes multiple detectors 21. The detectors 21 may also be adjustably mounted. In preferred embodiments, the detectors are either CCD arrays, photodetector arrays, quadrant sensing arrays, interferometry devices or digital position sensitive detection devices.

The emitters 13, 15 of the emitter unit 3 and the detectors 21 of the sensor unit 5 are used to establish a reference and measure position deviations. Position feedback is crucial in all phases of the positioning operation, and must be precise, accurate, rugged and reliable. In preferred embodiments of the device 1, two beams 17, 19 on parallel paths are used to resolve displacement in five axes. FIGS. 1 and 2 show possible configurations. Beam sources 13, 15 in the emitter unit 3 are mounted to the moveable portion 9 of the machinery to be measured. Alternatively, the beam sources 13, 15 may be mounted to the fixed portion 11 of the machinery and the detectors 21 mounted to the moveable portion 9, but this requires generally longer cable lengths from the sensor unit 5 to the processing unit 7. The beam sources 13, 15 serve to reference the axis of travel. The arrangement of the detectors 21 serves to resolve three axes of rotation and two axes of translation. Positional information for all the axes except the longitudinal traversal is provided by the geometry of beam sources 13, 15 and detectors 21. As shown in FIGS. 1 and 2, the present invention preferably includes a first detector 23 positioned for receiving a first beam 17, a second detector 25 positioned for receiving a second beam 19 and a third detector 27 positioned between the first detector 23 and the emitter unit 3. The third detector 27 is a transparent detector that impinges the line of travel of the first beam 17 and allows the first beam 17 to continue to the first detector 23. As shown FIG. 2, for redundancy a fourth detector 29 is positioned between the second detector 25 and the emitter unit 3. The fourth detector 29 is a transparent detector that impinges the line of travel of the second beam 19 but allows the second beam 19 to continue to the second detector 25.

It is readily understood that the positions of the third and fourth detectors may be switched.

The processing unit 7 is connected to the sensor unit 5 and is preferably a microcontroller or a computer, such as a personal computer. The processing unit 7 has a display 31 for providing position feedback.

The translational or Z-axis, in direction of machine travel, is measured by a separate laser through triangulation, Michelson interferometry, or optical position encoders. Alternatively, Z-axis position sensing can be performed by linear encoders or drive axis servo-positioning. As shown in FIG. 1, a preferred embodiment includes a retractable cable 33 which is attached to a variable resistor to convert position to voltage. Any suitable mounting, such as a magnet, may be used to mount the cable to the moveable platform.

The laser alignment technique of device 1 has many options with respect to laser position sensing techniques. One technique uses quadrant sensing arrays. FIGS. 2 and 3 illustrate the laser spot location technique using a four element array. The quadrant sensing technique is inexpensive, easy to set up and independent of environmental concerns. It has a small process requirement, but also provides low resolution and an extremely limited range of motion. A second technique uses a pixel array to resolve beam position on a grid of photodiodes. That technique is easy to set up, independent of environmental concerns and inexpensive. The pixel array technique has better resolution and is capable of measuring larger displacements than the quadrant array technique. Disadvantages of the pixel array technique include a high processor requirement and a resolution limited by pixel density. A third laser positioning technique, interferometry, measures distance by counting interference fringes from a reflected beam. Advantages of that technique are long range and resolution better than one micron. Disadvantages of interferometry include a very high update frequency requirement, limited range of angular motion, high cost and difficulties with set up. One must compensate for the environment and stabilize the beam, and can only resolve Z, pitch and yaw. The preferred technique, digital position sensitive detection, uses an array of stripes 35 to determine the centroid of the beam spot 37 in hardware, as shown in FIG. 4. That technique offers resolution of less than one micron, ease of set up, environmental stability, low cost, is capable of measuring large displacements, and processes position independently. The x-y position of the beam centroid 37 is calculated from the relative photo-currents detected at the stripes 35. The arrangement of 3 detectors (or four for redundancy) as shown in FIG. 2 is then used as follows: The set of three x-y position pairs is reported to the processing unit 7 which uses the known distances between the rigidly mounted detectors and the beams along with the x-y position data to calculate angular and linear displacements in software. FIG. 5 shows as an example the geometry which can be used with just two detectors to resolve yaw or angular motion about the Y-axis. There are a total of six measured quantities used to resolve the three angles and two linear displacements. The six measured quantities, as shown in FIG. 5, are $Ax_1$, $Ay_1$, $Ax_2$, $Ay_2$, $Ax_3$ and $Ay_3$. That arrangement of sensors allows for the resolution of the five degrees of freedom, namely, two linear displacements and three angles. Each of the three sensors can alone measure only two linear displacements. The pure yaw rotation shown in FIG. 5 would naturally yield zero x-translation (detectors perceive opposite sign, but equal magnitude of x-translation) as it should. FIG. 5 illustrates beams 1 and 2 as separate beams, but, in fact, they are the same beam when sensor two is transparent. The logic of FIG. 4 which shows the unique signature of each motion serves to illustrate how the known 4-detector geometry is used. FIG. 4 also demonstrates the redundancy of the fourth detector.

The beam sources 13, 15 are mounted such that from one end of the machine bed two parallel beams 17, 19 can be adjusted concomitantly in X, Y, roll, pitch and yaw. That facilitates easy initial alignment for the user.

The position error measurement effort of the proposed technique is now summarized. When the device 1 is first set up in a new location, initial alignment is performed to ensure alignment of beams 17, 19 with the axis of travel for the moving platform 9 to be measured. Having the X and Y axes define the plane perpendicular to the moving platform 9 line of travel, the angle of rotation about X, Y and Z is initialized to zero relative to the detector arrangement. Placement of the emitter unit 3 is facilitated by aligning precision machined edges on the base of the emitter unit 3 with one or more edges of the moving platform 9. Motion of the moving platform 9 is then initiated. The multi-axis measurement device 1 provides feedback through the processing unit 7, such as a microcontroller having a small display screen 31 with specific information about any misalignments and verification that the beams 17, 19 remain within the limits of the detectors 21.

After measurements are completed, the data collected are available for downloading to a personal computer. The downloaded data may be used to construct a three-dimensional graphic representation of the positioning errors. A hard copy of the image scan may be created, providing the user with documentation of machine quality required for ISO 9000 and other quality management programs.

In preferred embodiments, the detectors are digital position sensitive detectors (DPSD). Each DPSD is a grid-array sensor that uses an array of stripes to measure the intensity profile of an impinging laser beam. A small microprocessor then interpolates the position of the beam centroid, making use of cubic interpolating algorithms to accurately resolve the centroid position with a ten to twenty-fold resolution improvement over the geometric sensor stripe spacing. The beam centroid, in the form of absolute beam position in microns, is converted to hexadecimal coordinates in microns by the DPSD microprocessor, translated to serial data and delivered to a host processor, such as a personal computer or microcontroller, over a two-wire RS232C communication link, typically over a distance of two to ten meters. One microcontroller which may be employed for DPSD provides nine modes of operation in which the sampling of sensor stripes are varied between the immediate range of the last measured beam centroid to the entire sensor area. The larger the sampled area, the slower the position feedback. Averaging of several position coordinates may also occur in the microprocessor, slowing the output but improving accuracy. The microprocessor circuit may further include a phase lock loop provided in conjunction with an on-board laser diode driver, thereby providing a reliable means of isolating laser signals from variations in ambient light. Microcontroller units for use in the present system are readily accessible. Current technology, employing 8 bit microprocessors, provides 30 to 75 position coordinates per second with one micron resolution. Revisions with 16 bit microprocessing provides hundreds of position coordinate pairs per second with sub-micron accuracy. Commercial microcontrollers are commonly available with 16-bit, 40 MHz processing and better. High-level compiler languages are well established for those controllers, including object-oriented programming languages such as C++. Preferably, the present system includes a compact microcontroller unit having a 16-bit microcontroller, a liquid crystal display with graphical capabilities and a keypad.

The sensing area of the present invention is large, normally on the range of 400 mm$^2$ and potentially as large as 10,000 mm$^2$. Transparent versions of the sensor provide for use of in-line stacks of sensors for detecting both position and angular displacements. Strategic advantages are realized by using the digital position sensitive detector including:

an enlarged sensing area;

the sensor is entirely linear across the entire area;

no amplification and acquisition hardware is required;

lower costs;

improved resolution;

the phase lock loop circuitry of the microprocessor is well suited for an industrial environment;

DPSD sensors require no more than laser-diode levels of power from the light source digital position information is relatively immune to noise over 1–10 meters While the invention has been described with reference to specific embodiments, modifications and variations of the invention may be constructed without departing from the scope of the invention, which is defined in the following claims.

We claim:

1. A position measurement apparatus for measuring position deviations in five axes when a moveable platform traverses a workpiece comprising an emitter unit mounted on the platform for generating source beams in directions generally parallel to a line of travel of the platform, a sensor unit positioned on the workpiece and aligned with the emitter unit for sensing the source beams and for providing position alignment data and a processing unit connected to the sensor unit for converting the position alignment data to displacements in five axes.

2. The apparatus of claim 1, wherein the emitter unit further comprises a first emitter for emitting a first beam and a second emitter for emitting a second beam.

3. The apparatus of claim 2, wherein the first emitter and the second emitter are adjustably mounted to the moveable platform.

4. The apparatus of claim 1, wherein the emitter unit is a laser beam emitter unit further comprising a first laser beam source and a second laser beam source.

5. The apparatus of claim 4, wherein the first laser beam source and the second laser beam source are selected from the group consisting of a miniature laser and a laser diode.

6. The apparatus of claim 4, wherein the laser beam sources are adjustably mounted to the moveable platform to allow rotation about a vertical yaw axis and a horizontal pitch axis.

7. The apparatus of claim 1, wherein the sensor unit further comprises multiple detectors.

8. The apparatus of claim 7, wherein the multiple detectors are selected from the group consisting of CCD arrays, photodetector arrays, quadrant sensing arrays, interferometry devices and digital position sensitive detection devices.

9. The apparatus of claim 7, wherein the source beams further comprise a first beam and a second beam, and wherein the multiple detectors further comprise a first detector positioned for receiving the first beam, a second detector positioned for receiving the second beam and a third detector positioned between the first detector and the emitter beam unit, wherein the third detector is a transparent detector that impinges a line of travel of the first beam and allows the first beam to continue to the first detector.

10. The apparatus of claim 9, further comprising a fourth detector positioned between the second detector and the emitter beam unit, wherein the fourth detector is a transparent detector that impinges a line of travel of the second beam and allows the second beam to continue to the second detector.

11. The apparatus of claim 1, wherein the sensor unit further comprises a linear measurement sensor for determining position in a translational direction.

12. The apparatus of claim 11, wherein the linear measurement sensor is selected from the group consisting of a laser triangulation device, an interferometry device, an optical position encoder and a drive-axis servo-positioning encoder and a linear encoder.

13. The apparatus of claim 11, wherein the linear measurement sensor is a position encoding sensor further comprising a retractable cable and a variable resistor for converting position to voltage, wherein the cable has a first end connected to the moveable platform and a second end connected to the resistor.

14. The apparatus of claim 1, wherein the processing unit is selected from the group consisting of a microcontroller and a personal computer.

15. The apparatus of claim 1, wherein the processing unit further comprises a microcontroller having a display, a microprocessor and a keypad.

16. The apparatus of claim 15, wherein the microprocessor is selected from the group consisting of an eight bit microprocessor and a sixteen bit microprocessor, and wherein the display is a liquid crystal display.

17. The apparatus of claim 15, further comprising a personal computer for receiving downloaded position data from the microcontroller and for constructing three-dimensional graphic representations of the downloaded position data.

18. The apparatus of claim 1, wherein the sensor unit further comprises multiple detectors, wherein the emitter unit further comprises a pair of beam emitters for emitting first and second beams, and wherein the detectors and the emitters are aligned such that beams emitted from the beam emitters and received by the detectors are substantially parallel or nearly parallel workpiece and off axis.

19. A position measurement apparatus for measuring position deviations in five axes when a moveable platform traverses a workpiece comprising an emitter unit mounted on the workpiece for generating source beams in directions generally parallel to a line of travel of the platform, a sensor unit positioned on the moveable platform and aligned with the emitter unit for sensing the source beams and for providing position alignment data and a processing unit connected to the sensor unit for converting the position alignment data to displacements in five axes.

20. The apparatus of claim 19, wherein the emitter unit further comprises a first emitter for emitting a first beam and a second emitter for emitting a second beam.

21. The apparatus of claim 20, wherein the first emitter and the second emitter are adjustably mounted to the workpiece.

22. The apparatus of claim 19, wherein the emitter unit is a laser beam emitter unit further comprising a first laser beam source and a second laser beam source.

23. The apparatus of claim 22, wherein the first laser beam source and the second laser beam source are selected from the group consisting of a miniature laser and a laser diode.

24. The apparatus of claim 22, wherein the laser beam sources are adjustably mounted to the workpiece to allow rotation about a vertical yaw axis and a horizontal pitch axis.

25. The apparatus of claim 19, wherein the sensor unit further comprises multiple detectors.

26. The apparatus of claim 25, wherein the multiple detectors are selected from the group consisting of CCD arrays, photodetector arrays, quadrant sensing arrays, interferometry devices and digital position sensitive detection devices.

27. The apparatus of claim 25, wherein the source beams further comprise a first beam and a second beam, and wherein the multiple detectors further comprise a first detector positioned for receiving the first beam, a second detector positioned for receiving the second beam and a third detector positioned between the first detector and the emitter beam unit, wherein the third detector is a transparent detector that impinges a line of travel of the first beam and allows the first beam to continue to the first detector.

28. The apparatus of claim 27, further comprising a fourth detector positioned between the second detector and the emitter beam unit, wherein the fourth detector is a transparent detector that impinges a line of travel of the second beam and allows the second beam to continue to the second detector.

29. The apparatus of claim 19, wherein the sensor unit further comprises a linear measurement sensor for determining position in a translational direction.

30. The apparatus of claim 29, wherein the linear measurement sensor is selected from the group consisting of a laser triangulation device, an interferometry device, an optical position encoder and a drive-axis servo-positioning encoder and a linear encoder.

31. The apparatus of claim 29, wherein the linear measurement sensor is a position encoding sensor further comprising a retractable cable and a variable resistor for converting position to voltage, wherein the cable has a first end connected to the moveable platform and a second end connected to the resistor.

32. The apparatus of claim 19, wherein the processing unit is selected from the group consisting of a microcontroller and a personal computer.

33. The apparatus of claim 19, wherein the processing unit further comprises a microcontroller having a display, a microprocessor and a keypad.

34. The apparatus of claim 33, wherein the microprocessor is selected from the group consisting of an eight bit microprocessor and a sixteen bit microprocessor, and wherein the display is a liquid crystal display.

35. The apparatus of claim 33, further comprising a personal computer for receiving downloaded position data from the microcontroller and for constructing three-dimensional graphic representations of the downloaded position data.

36. The apparatus of claim 19, wherein the sensor unit further comprises multiple detectors, wherein the emitter unit further comprises a pair of beam emitters for emitting first and second beams, and wherein the detectors and the emitters are aligned such that beams emitted from the beam emitters and received by the detectors are substantially parallel or nearly parallel workpiece and off axis.

37. A method for measuring position deviations in five axes comprising the steps of positioning an emitter unit having multiple beam emitters on a moveable platform, positioning a sensor unit having multiple detectors on a stationary workpiece, propagating at least two beams from the multiple beam emitters, orienting the emitters such that the at least two laser beams are generally parallel to each other and substantially parallel to a direction of travel of the moveable platform, aligning the multiple detectors such that one of the at least two laser beams impinges at least one detector, transversing the stationary workpiece with the moveable platform, continuously impinging the detectors with the at least two laser beams, generating position data from the at least two laser beams impinging on the detectors, and converting the position data to position-error data.

38. The method of claim 37, further comprising the step of continuously displaying the position-error data.

39. The method of claim 37, further comprising storing the position-error data, transferring the stored position-error data to a computer and generating graphical representations of the stored position-error data.

40. The method of claim 39, further comprising the step of generating a hard copy of the graphical representations.

41. The method of claim 37, further comprising providing a linear measurement unit and determining translational position in the direction of the moveable platform using the linear measurement unit.

42. The method of claim 37, wherein the alignment step further comprises squaring perpendicular edges of the emitter unit against a surface of the workpiece.

43. The method of claim 37, wherein the at least two beams further comprise a first beam and a second beam, wherein the positioning a sensor unit step further comprises providing a first detector in a path of the first beam, providing a second detector in a path of the second beam and providing a third, transparent detector in the path of the first beam between the first detector and the emitter unit.

44. The method of claim 43, wherein the positioning a sensor unit step further comprises providing a fourth, transparent detector in the path of the second beam between the second detector and the emitter unit.

45. The method of claim 37, wherein the alignment step further comprises initializing to zero an angle of rotation about X, Y and Z axes relative to detector arrangement.

* * * * *